Patented June 22, 1926.

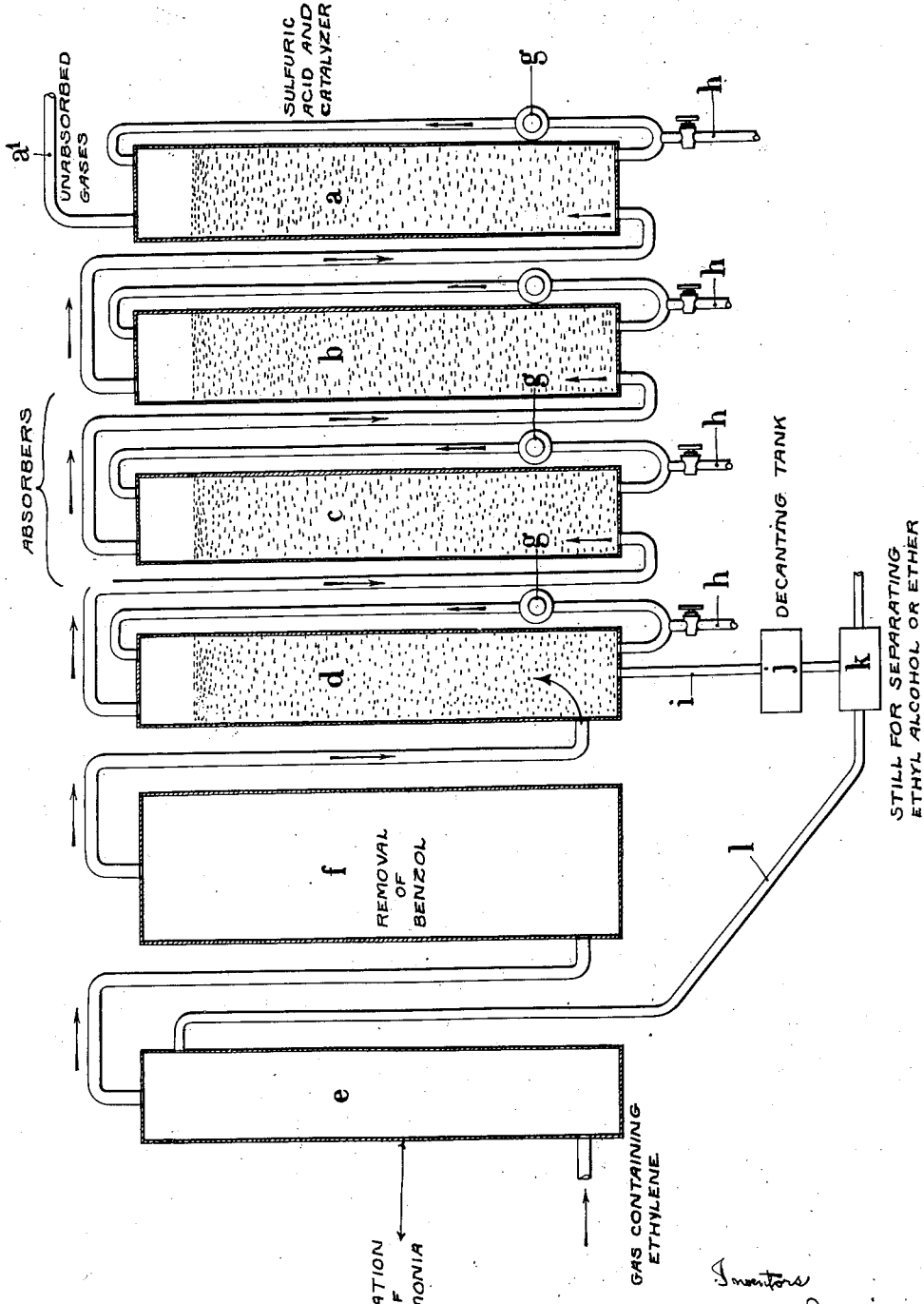

1,589,372

UNITED STATES PATENT OFFICE.

AUGUSTIN AMÉDÉE LOUIS JOSEPH DAMIENS, OF ARCUEIL-CACHAN, AND MARIE CHARLES JOSEPH ELISÉE DE LOISY, OF PARIS, FRANCE, AND OLIVIER JOSEPH GISLAIN PIETTE, OF BRUSSELS, BELGIUM.

PROCESS FOR THE MANUFACTURE OF ETHYL SULPHURIC ACID.

Application filed December 6, 1919, Serial No. 343,118, and in France September 5, 1919.

It is known, from the researches of Mr. Berthelot, that ethyl alcohol can be made from ethylene. This scientist has been able, by working on sufficiently large masses, to combine pure ethylene with sulphuric acid, which leads to the production of ethyl hydrogen sulphate or ethylsulphuric acid, which gives with water ethyl alcohol and sulphuric acid, which is thus regenerated. This reaction, which would only be of interest from the theoretical point of view if ethylene could only be prepared by the classical method, that is to say starting from alcohol itself, possesses very special importance from the industrial point of view by reason of important industrial sources of ethylene which have been unworked up to the present and the development of which would permit, by the application of the reaction mentioned above, the production of alcohol under very marked economical conditions. Ethylene exists in illuminating gas, in the gas from coke ovens, and in other industrial gases, and serves solely as a fuel like the gases with which it is mixed; it therefore follows that its intrinsic value is very imperfectly utilized.

The fixing of the ethylene by the sulphuric acid has not up to the present been able to come into consideration from a practical point of view, by reason of the extreme slowness with which the sulphuric acid dissolves it; thus for example as Berthelot describes it, in an operation which requires four days, there were necessary 53,000 shakes to combine 30 litres of ethylene with 900 grams of acid; in another experiment made on mercury, the absorption was only complete after 3,000 shakes.

Berthelot, the first, was able to obtain alcohol starting from the ethylene of illuminating gas, but this was by a series of slow and costly reactions, excluding all possibility of its being carried out on an industrial scale. The idea of thus catching and utilizing the ethylene of the illuminating gas or of industrial gases was taken up by numerous authors who sought to render useful the fixing of ethylene under the form of ethyl sulphuric acid. Some suggested for this purpose the heating of the acid, but the results obtained were not sufficient to justify the practical working of the process.

This application for a patent has for its object a process for rapidly fixing the ethylene leading to the production of ethyl alcohol or ether under particularly economical conditions.

This process consists, essentially in fixing the ethylene by means of sulphuric acid of 66 degrees Baumé to which there are added chemical catalyzers that by their presence increase the velocity of the reaction of the acid on the gas, to a sufficient extent to render the operation capable of being carried out industrially.

The catalyzing substances capable of being employed in the present process are sulphates of iron, cobalt, nickel, cerium, manganese, chromium, molybdenum, tungsten, uranium, copper, lead, mercury, gold, vanadium, titanium, tin and phosphoric, phosphorous, sulphuric and arsenious anhydrides.

The addition of one or other of these catalyzing substances to sulphuric acid permits of this latter reacting rapidly on the ethylene, giving ethylsulphuric acid which when treated with water gives alcohol.

In the case of employing cuprous sulphate as a catalyzer, the product is also ethyl alcohol.

The catalyzers specified above can be utilized either in solution in the sulphuric acid, or in suspension if they are insoluble; they can be employed alone or associated one with another.

The chemical compounds given as catalyzers can be replaced by substances capable of producing them under the action of sulphuric acid; thus for example, instead of metallic sulphates, the corresponding metals in a compact or divided state, the oxides, the carbonates, etc., can be employed.

The reaction of the sulphuric acid, in the presence of a catalyzer, on the ethylene can be effected at the ordinary temperature, but its effect is much more active if the temperature is higher but does not exceed substantially a limit of about 100 to 120° C. In this case, either the gas or the sulphuric reagent or both are brought to the desired temperature.

The rapidity of the reaction is further increased if the reacting substances are in as great a state of division as possible; this division can be obtained for example by one or other of the following means:

(a) by the flow of the acid in a continuous or intermittent manner on to materials in a state of division having a large surface, viz., granulated pumice, granulated brick, silicious pebbles, etc., with systematic circulation of this acid and of the gas up to the saturation of the acid to the desired degree.

(b) by the spraying of the acid into the gas; this spraying can be effected by projecting the acid forcibly on to the interior walls of the apparatus in which the gas circulates, either the ethylene gas or the complex gas in which it is contained, or by the expansion of the gas in the acid.

This process is applicable to the fixing of the pure ethylene obtained by any chemical reaction, and also of the ethylene contained in industrial gases such as illuminating gas, the gas from coke ovens, etc.

In the last case, the action of the reagents for fixing the ethylene will take place preferably when the gases will have been freed from certain products which they contain; for example, in the case of the treatment by the present process of illuminating gas and coke oven gases, these gases, before being subjected to the action of the sulphuric acid to which a catalyzer has been added, are freed from ammonia, benzol, water and hydrocarbons of the ethylene series ($C_nH_{2n}$) and of the acetylene series ($C_nH_{2n-2}$).

The gas, after having been freed from the ammonia and the benzol, is subjected systematically to the action of one of the sulphuric reagents above specified; for this purpose, the gas first traverses one or more columns where the sulphuric reagent previously saturated with ethylene is circulated, as will be hereinafter described, and is there freed from the water which it contains, and from traces of hydrocarbons of the ethylene series ($C_nH_{2n}$) and of the acetylene series ($C_nH_{2n-2}$). The gas to be treated then traverses one or more columns where the fresh sulphuric reagent circulates and fixes the ethylene contained in the gas, and after being thus saturated with ethylene is brought into the first columns just mentioned.

The necessary dessication of the gas is thus effected in a very economical manner; when the sulphuric reagent has reached a degree of dilution such that it does not dry any further, or that alcohol or ether commences to be set free by hydrolysis from the ethylsulphuric acid, it is decanted or filtered, and subjected to distillation.

The diluted sulphuric acid resulting from this distillation can be utilized for fixing the ammonia contained in the gas to be treated, thus producing sulphate of ammonia. The sulphuric acid employed in this process for the manufacture of alcohol is then finally recovered and used in a commercial form.

In order to fix the ideas, there will be hereinafter described with reference to the accompanying diagrammatic drawing, an arrangement whereby this process may be carried into practice in the case of its application to the treatment of illuminating gas or coke oven gas, for example.

As shown in the drawing, this apparatus comprises a plurality of columns $a$, $b$, $c$, $d$, in which circulate in a systematic manner and in opposite directions the gas to be treated and the sulphuric reagent, that is to say the sulphuric acid to which a catalyzing substance has been added. The columns $a$, $b$, $c$, $d$, are filled with divided materials having a large surface, such as granulated pumice, granulated brick, silicious pebbles, etc.

The gas to be treated, before entering the column $d$, traverses an apparatus $e$ in which the fixing of the ammonia takes place, and an apparatus $f$, where the benzol is removed by ordinary means.

The direction of movement of the gas in the columns $a$, $b$, $c$, $d$, is indicated by the arrows shown on the drawing; each column is provided with an apparatus, a pump $g$ for example, enabling the acid to be pumped up from the bottom to the top of the column and thus maintain a continuous circulation in the opposite direction to that followed by the gas.

When the sulphuric reagent is saturated with ethylene in the first column, it is withdrawn through the pipe $h$; it is then passed successively, and in the same manner, through the columns $b$, $c$, $d$; during its course through these columns, this acid frees the gas, which circulates in it but in the opposite direction from the water, and from any traces of hydrocarbons of the ethylene series ($C_nH_{2n}$) and of the acetylene series ($C_nH_{2n-2}$) which it may contain.

At the outlet of the column $d$ there is collected an acid product resulting from the hydration of the reagent saturated with the gases which it has absorbed; this solution which may be charged with particles of the catalyzing substance is conducted if necessary through the pipe $i$, to a filter press or to a decanting tank $j$ and thence to the distilling apparatus $k$ where the separation of the alcohol takes place.

This distilling apparatus is connected to the ammonia fixing apparatus $e$ by a conduit $l$ which returns to the latter apparatus the sulphuric acid from the distillation.

The circulation of the gas and of the acid through the several apparatus forming the plant above described, can be effected by means of any suitable known apparatus.

It should be remarked that, according to the degree of dilution of the acid which is delivered to the distilling apparatus, there can be obtained either alcohol, as above mentioned, or ether. This improved process thus also permits the direct production of ether starting from ethylene.

It is obvious that the plant above described is only given by way of example and that any other apparatus can be employed for carrying the process into practice.

Instead of sending the acid saturated with ethylene in the previous columns, where it will fix the hydrocarbons of the ethylene series ($C_nH_{2n}$) and of the acetylene series ($C_nH_{2n-2}$), the hydration products of which must afterwards be separated by rectification of the ethyl alcohol, we may, if preferred, immediately remove the ethyl alcohol from the said acid in a condition of great purity, and separately collect, on another acid serving as a dehydrating substance for the gas, the products of the precipitated carbides.

This modification, which at first sight seems less simple, does not necessitate heavier expenses, by reason of the fact that: the diluted acid may be easily re-concentrated by causing the gas which has been dried to bubble through the acid and by heating the latter by means of the waste heat of the fumes issuing from the regenerators of the furnaces and passing to the stack.

This concentration, which is so to speak automatic, would be made in an apparatus arranged after the column $a$ wherein the ethylene is fixed.

The facility of this operation allows of using as initial acid, instead of acid of 66° B., less concentrated acid and consequently cheaper acid, of 53° B. strength for instance, as that commonly used for fixing ammonia in the process known as "direct ammonia fixing process."

Claims.

1. A process for the production of ethyl-sulphuric acid which consists in fixing the ethylene by means of sulphuric acid in presence of a sulphate of a heavy metal practically insoluble in concentrated sulphuric acid and acting as catalyst.

2. A process for the production of ethyl-sulphuric acid which consists in fixing the ethylene by means of sulphuric acid in presence of a derivative of a heavy metal giving, under the action of sulphuric acid, a sulphate practically insoluble in concentrated sulphuric acid and acting as catalyst.

3. A process for the production of ethyl-sulphuric acid which consists in fixing the ethylene by means of sulphuric acid in presence of a sulphate of a heavy metal finely divided, practically insoluble in concentrated sulphuric acid and acting as catalyst.

4. A process for the production of ethyl-sulphuric acid which consists in fixing the ethylene by means of sulphuric acid of 66° B., in presence of a sulphate of a heavy metal, practically insoluble in concentrated sulphuric acid and acting as catalyst.

5. A process for the production of ethyl-sulphuric acid which consists in fixing the ethylene by means of sulphuric acid of 66° B. at a temperature higher than the ordinary temperature but not exceeding substantially a limit of about 100 to 120° C., in presence of a sulphate of metal, finely divided, practically insoluble in concentrated sulphuric acid and acting as catalyst.

6. A process for the production of ethyl-sulphuric acid which consists in fixing the ethylene by means of sulphuric acid in presence of a derivative of copper giving, under the action of sulphuric acid, a sulphate of copper acting as catalyst.

7. A process for the production of ethyl-sulphuric acid which consists in fixing the ethylene by means of sulphuric acid of 66° B. at a temperature higher than the ordinary temperature but not exceeding substantially a limit of about 100 to 120° C., in presence of a derivative of copper giving, under the action of sulphuric acid, a sulphate of copper acting as catalyst.

The foregoing specification of our improved process for the manufacture of alcohol or ether, signed by us this 13th day of November 1919.

AUGUSTIN AMÉDÉE LOUIS JOSEPH DAMIENS.
MARIE CHARLES JOSEPH ELISÉE de LOISY.
OLIVIER JOSEPH GISLAIN PIETTE.